United States Patent [19]
Miyake et al.

[11] Patent Number: 5,444,758
[45] Date of Patent: Aug. 22, 1995

[54] BEAM POSITION DETECTING DEVICE

[75] Inventors: Akira Miyake; Mitsuaki Amemiya, both of Isehara, Japan

[73] Assignee: Canon Kabushiki Kaisha, Tokyo, Japan

[21] Appl. No.: 257,522

[22] Filed: Jun. 9, 1994

[30] Foreign Application Priority Data

Jun. 14, 1993 [JP] Japan .................. 5-142017

[51] Int. Cl.[6] ............................................ G21K 5/00
[52] U.S. Cl. .................................. 378/113; 378/119; 378/10; 378/145
[58] Field of Search ............. 378/113, 119, 145, 151, 378/121, 137, 138, 10, 19, 16, 12, 34, 35; 250/491.1

[56] References Cited

U.S. PATENT DOCUMENTS

| | | | |
|---|---|---|---|
| 4,410,270 | 10/1983 | Zuckerman | 356/152 |
| 4,562,350 | 12/1985 | Thirouard et al. | 250/239 |
| 5,131,022 | 7/1992 | Terashima et al. | 378/34 |
| 5,157,700 | 10/1992 | Kurosawa et al. | 378/34 |
| 5,285,488 | 2/1994 | Watanabe et al. | 378/151 |

FOREIGN PATENT DOCUMENTS

| | | |
|---|---|---|
| 0094274 | 11/1983 | European Pat. Off. . |
| 0133027 | 2/1985 | European Pat. Off. . |
| 1552369 | 9/1979 | United Kingdom . |
| 2162634 | 2/1986 | United Kingdom . |

*Primary Examiner*—David P. Porta
*Assistant Examiner*—Don Wong
*Attorney, Agent, or Firm*—Fitzpatrick, Cella, Harper & Scinto

[57] ABSTRACT

A beam position detecting device wherein the intensity of a radiation beam from a synchrotron ring is measured on the basis of electric currents flowing through two wires, while accumulated electric current in the synchrotron ring is measured by using a current transformer. The beam position can be determined accurately on the basis of these measured values.

9 Claims, 7 Drawing Sheets

BEAM POSITION DETECTING DEVICE

FIELD OF THE INVENTION AND RELATED ART

This invention relates to a beam position detecting device for detecting the position of a beam such as synchrotron radiation. In another aspect, the invention is concerned with a system such as an exposure apparatus, a spectroscopic apparatus or an X-ray microscope, for example, which uses a beam position detecting system such as above.

FIG. 7 shows an example of a beam position detecting device for detecting the position of a beam such as synchrotron radiation emitted from a synchrotron ring. In the illustrated arrangement, two wires are stretched above and below a sheet-like synchrotron radiation beam so as to measure electric current produced by photoelectric effect. If the outputs of the two wires are denoted by $S_1$ and $S_2$, the beam position Y can be determined as follows:

$$Y = K(S_1 - S_2)/(S_1 + S_2)$$

where K is a proportion constant. Alternatively, while taking into account the non-linearity, the position Y may be determined as follows:

$$Y = F(S_1 - S_2)/(S_1 + S_2)$$

where F is a calibration function.

While the synchrotron radiation beam has a sheet-like shape, it is not exactly a parallel sheet-like beam, but has a small divergence (expansion). The degree of such divergence changes with charged particle current. If, for example, accumulated electric current decreases by about 80 mA such as shown in FIG. 8, the size of the light emission point of the synchrotron radiation reduces by about 20% or more. Also, with this reduction, the degree of divergence of the synchrotron radiation beam is lowered.

In the current measurement method based on use of two wires, if the divergence of synchrotron radiation reduces, the change in electric current of the wire with a change in position of the synchrotron radiation beam becomes large. As a result, even if the position of the synchrotron radiation beam is constant, the value of "$(S_1-S_2)/(S_1+S_2)$" changes. Thus, the change in accumulated current directly produces an error in the position measurement, and decreased precision of position measurement results.

More specifically, it is now assumed that two wires are spaced by 5 mm from each other. If the beam position is displaced, electric current of the wires changes such as shown in FIG. 9, wherein a solid line corresponds to a case where the beam width $\sigma$ is 1.0 mm while a broken line corresponds to a case where the beam width $\sigma$ is 0.9 mm. FIG. 10 illustrates a calibration function for determining the beam position from the value of $(S_1-S_2)/(S_1+S_2)$. Like FIG. 9, a solid line corresponds to a case where the beam width $\sigma$ is 1.0 mm while a broken line corresponds to a case where the beam width $\sigma$ is 0.9 mm. Determining the calibration function in the case of a beam width $\sigma$ of 1.0 mm and then calculating the beam position by using it, a change of the beam width $\sigma$ to 0.9 mm, for example, causes a measurement error of about 0.1 mm when the beam position is at 0.5 mm from the center.

In summary, the method described above involves a problem that a change in the degree of divergence of the synchrotron radiation beam with a change in the magnitude of charged particle current, accumulated in the synchrotron ring, causes an error in the measurement of beam position.

SUMMARY OF THE INVENTION

It is accordingly an object of the present invention to provide an improved beam position detecting device by which the beam position can be detected very precisely.

It is another object of the present invention to provide a system such as an exposure apparatus, a spectroscopic apparatus or an X-ray microscope, for example, which uses a beam position detecting device described above.

In accordance with an aspect of the present invention, there is provided a beam position detecting device which comprises detecting means for detecting, at different sites, the intensity of a radiation beam from a synchrotron ring, measuring means for measuring data related to an accumulated current value of the synchrotron ring, and determining means for determining the beam position of the radiation beam on the basis of outputs of said detecting means and measuring means.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

[Embodiment 1]

Figure 1:
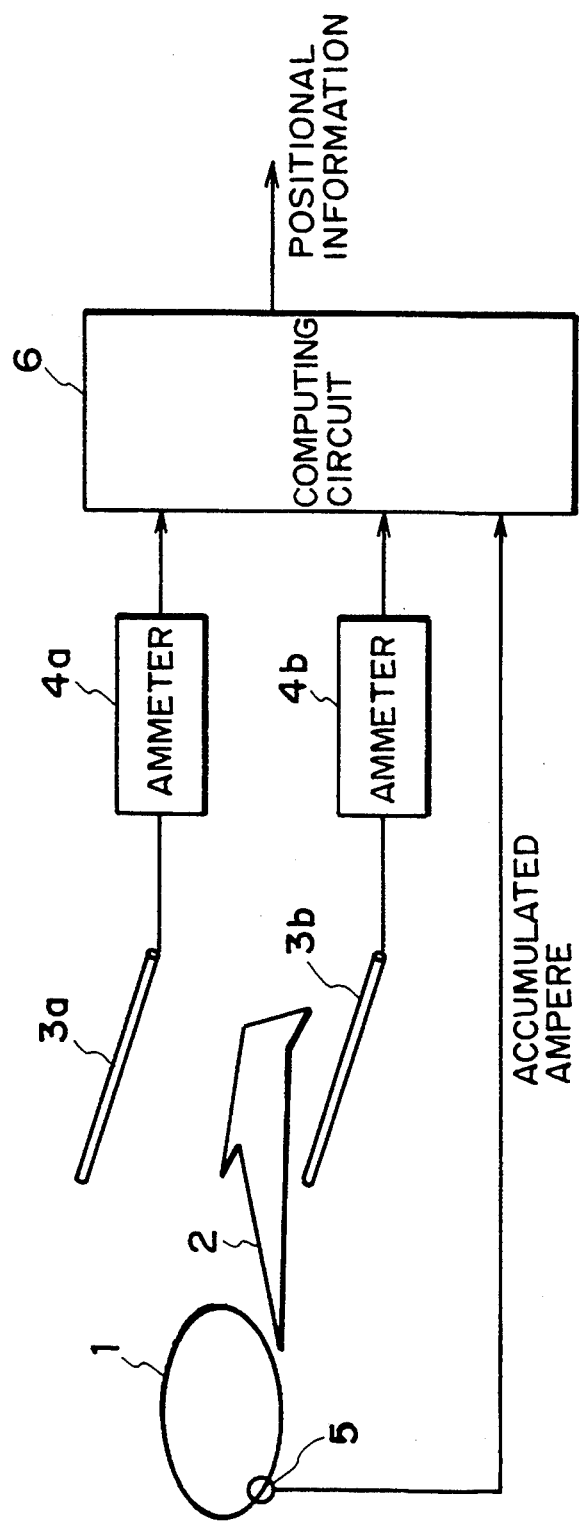
FIG. 1 is a schematic view of a beam position detecting device according to a first embodiment of the present invention.

FIG. 1 shows a first embodiment of the present invention. Denoted at 1 is a synchrotron ring; at 2 is synchrotron radiation light; at 3a and 3b are wires; at 4a and 4b are ammeters; at 5 is a current transformer (DCCT); and at 6 is a beam position computing circuit.

The two wires 3a and 3b are stretched in parallel to the synchrotron radiation beam 2 of sheet-like shape, above and below the beam, with an interspace of 5 mm. Electric currents produced by photoelectric effect are measured separately by means of the ammeters 4a and 4b. Simultaneously, charged particle current accumulated in the synchrotron ring 1 is measured by means of the current transformer 5. The three measured values thus obtained are applied to the computing circuit 6. The computing circuit 6 includes a memory which has stored therein a plurality of calibration functions corresponding to different accumulated current values, in the form of a table. One of these calibration functions corresponding to the measured accumulated current is referred to, and the beam position of the synchrotron radiation is calculated on the basis of the current magnitudes $S_1$ and $S_2$ of the wires.

Here, the manner of determining each calibration function stored in the computing circuit 6 will be explained. It is assumed that, in the case of the synchrotron ring of this embodiment, the beam width $\sigma$ of emitted X-rays changes linearly from 1.0 mm to 0.9 mm in response to a decrease of accumulated electric current from 200 mA to 100 mA. While moving stepwise the wires 3a and 3b by 0.01 mm (each step) relative to the radiation beam, the position Y as well as the currents $S_1$ and $S_2$ are measured. Then, a parameter X which is represented by:

$$X=(S_1-S_2)/(S_1+S_2)$$

is calculated. The values Y with stepwise movements at the pitch of 0.01 mm and the values X corresponding to them are memorized in the form of a table. This measurement is executed with respect to a variety of accumulated current values, with the electric current being changed successively by 10 mA pitch. Thus, the values Y and X corresponding to all the accumulated currents (10 mA intervals) are memorized. The calibration functions are prepared in this manner beforehand.

In actual operation of beam position measurement, a table of calibration functions closest to the measured accumulated current is referred to, and a value Xm closest to the value X determined on the basis of the measured values $S_1$ and $S_2$ is searched. Then, the value Y corresponding to that value Xm is read out of the memory, whereby the beam position is determined.

In the present embodiment, a calibration function is prepared with respect to every 10 mA of accumulated current. This step (10 mA step) corresponds to a change in beam width of 0.01 mm. Thus, the measurement error due to a change in beam width is about 0.005 mm at the largest when the beam position is at 0.5 mm from the center. On the other hand, since the calibration function tables are prepared with discrete values of 0.01 mm, an error attributable to that is 0.005 mm at the largest. As a consequence, the measurement error can be reduced to 0.01 mm or smaller, and the precision can be improved much as compared with the example described in the introductory part of this Specification. While the values of the tables are discrete, they may be complemented by calculation to further enhance the precision. The form of the calibration table described above is only a possible example, and the present invention is not limited to this.

In accordance with this embodiment of the present invention, the beam position is determined with the calibration function being changed or replaced correspondingly to a change in charged particle current accumulated in the synchrotron ring. Thus, no measurement error occurs even if the degree of divergence of the synchrotron radiation beam changes.

[Embodiment 2]

Figure 2:
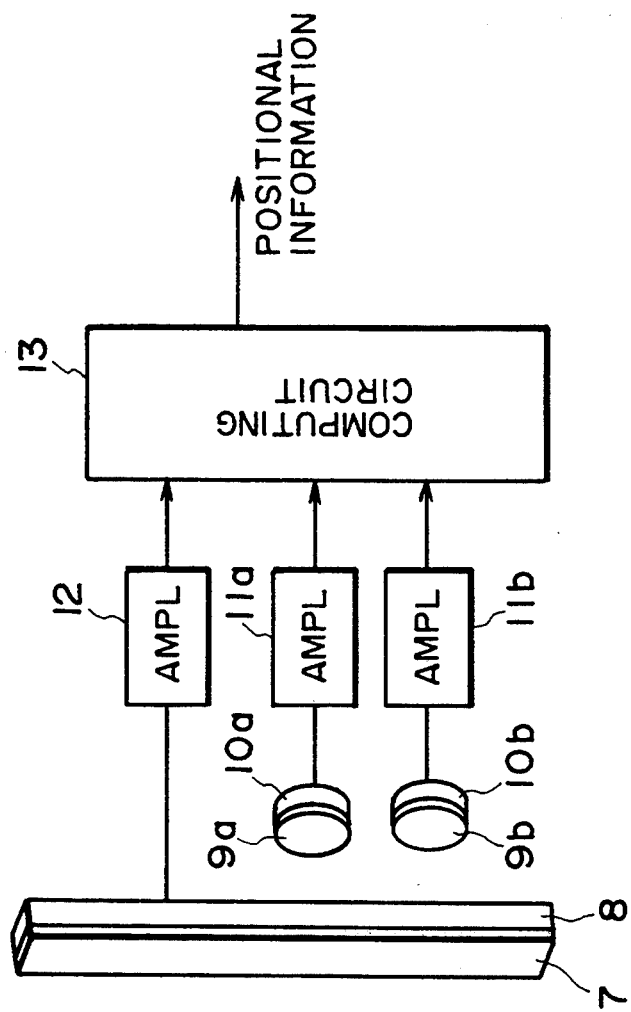
FIG. 2 is a schematic view of a beam position detecting device according to a second embodiment of the present invention.
Figure 2:
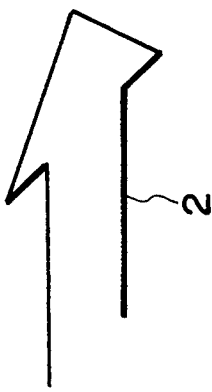

FIG. 2 shows an arrangement according to a second embodiment of the present invention. Denoted at 7 is a filter; at 8 is a photodiode; at 9a and 9b are filters; and at 10a and 10b are photodiodes. Detecting surfaces of the three photodiodes are disposed in the same plane which is perpendicular to a radiation beam 2, for example. Denoted at 11a, 11b and 12 are amplifiers for amplifying the outputs of the photodiodes. It is known that, in response to reception of a large quantity of X-rays, a photodiode is damaged and sensitivity decreases or dark current increases. The filters 7, 9a and 9b are attached to the front faces of the respective photodiodes, each comprising a film of aluminum, nickel, copper or graphite, for example, to attenuate the X-ray intensity to prevent damage of the element due to irradiation with X-rays.

By using two photodiodes 10a and 10b disposed above and below the radiation beam 2 of sheet-like shape, the intensity of the synchrotron radiation beam is measured at two sites. The measured values obtained through these two photodiodes are denoted here by $S_1$ and $S_2$. The photodiode 8 serves to obtain a measured value corresponding to the overall intensity of the synchrotron radiation beam, as a whole, and this measured value is denoted here by $S_3$. In a direction perpendicular to the beam surface, the photodiode 8 has a sufficient size of $10 \times \sigma$, for example. Thus, even if the beam is expanded in the perpendicular direction, it can be received within the size of the photodiode 8 such that the intensity of the beam as a whole can be detected and that the output thereof is proportional to the accumulated electric current. Namely, in this embodiment, the information related to the accumulated current value is indirectly obtained by means of the photodiode 8 (intensity detector).

Three measured values $S_1$, $S_2$ and $S_3$ are processed by a computing circuit 13. The computing circuit 13 serves to execute function approximation of a calibration function with the use of a polynomial, to calculate the position. That is, if the parameter X is $$X=(S_1-S_2)/(S_1+S_2)$$

the position Y is determined on the basis of a polynomial:

$$Y=A_0+A_1X+A_3X^3$$

wherein the first order coefficient $A_1$ of X is the function of $S_3$ and it is expressed as follows:

$$A_1=A_{10}+A_{11}S_3$$

The term of $A_{11}S_3$ represents the correction based on the accumulated current.

At different accumulated currents, the position Y as well as the outputs $S_1$, $S_2$ and $S_3$ are measured beforehand while moving the beam position measuring device relative to the synchrotron radiation beam, and the coefficients $A_0$, $A_{10}$, $A_{11}$, . . . , of the respective terms of calibration function are detected through a least square method. The results are memorized in a memory of the computing circuit 13. During an actual beam position measuring operation, the position Y is calculated on the basis of the measured values of $S_1$, $S_2$ and $S_3$, and the beam position is determined.

In this embodiment, the position is calculated by using a calibration function which includes charged particle current accumulated in the synchrotron ring. Therefore, even if the expansion of the synchrotron radiation beam changes due to a change in electric current, no measurement error occurs.

[Embodiment 3]

The beam position detecting device described above can be incorporated into an exposure apparatus, a spectroscopic apparatus or an X-ray microscope, for example. Now, an embodiment wherein the device is incorporated into an X-ray exposure system will be explained.

Figure 3:
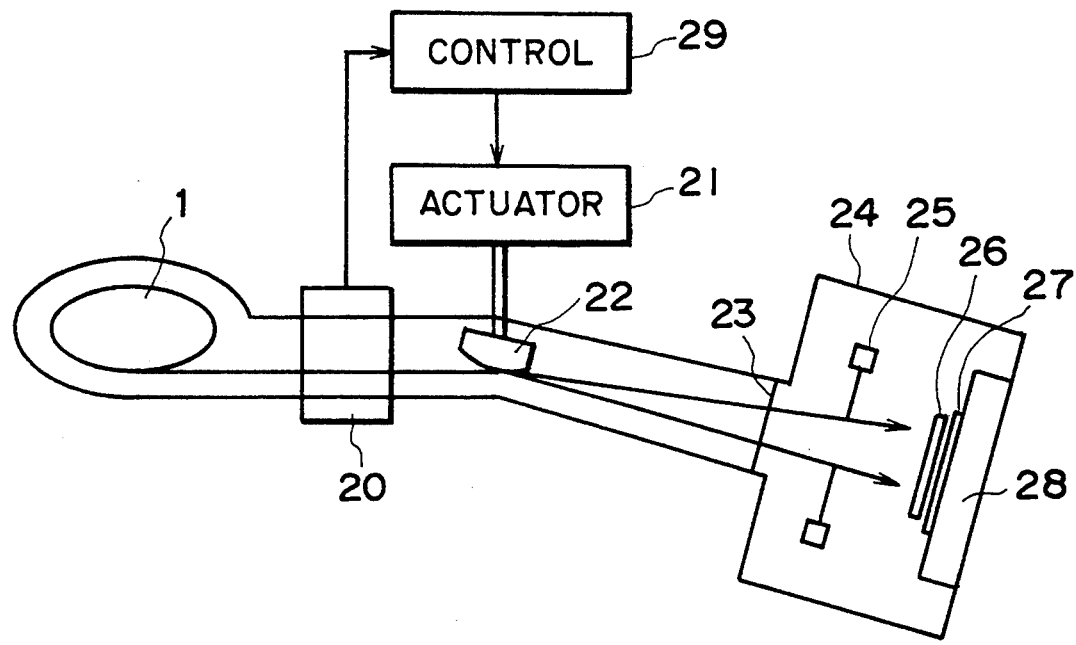
FIG. 3 is a schematic view of an X-ray exposure system according to a third embodiment of the present invention.

FIG. 3 shows an X-ray exposure system according to a third embodiment of the present invention. A radiation X-ray beam emitted from a synchrotron ring 1 is received by a beam position detecting device of the structure as described in any one of the embodiments explained above, whereby the position of the beam is detected. The radiation beam is expanded by a convex reflection mirror 21. The mirror 21 can be adjusted by a mirror actuator 22 in response to a signal from a controller 29. The expanded beam passes through a beryllium (Be) window 23 and it is directed to an exposure apparatus 24. The inside of the exposure apparatus 24 is filled with a helium gas. The X-rays go through a mask 26 and the pattern of the mask is transferred to a wafer 27 which is placed on an X-Y stage 28.

The controller 29 controls the mirror actuator 22 on the basis of measurement by the beam position detecting device 20, whereby the position of the reflection mirror 21 is controlled. This control assures uniform exposure of the mask and wafer irrespective of a change in the position of the synchrotron radiation beam.

[Embodiment 4]

Figure 4:
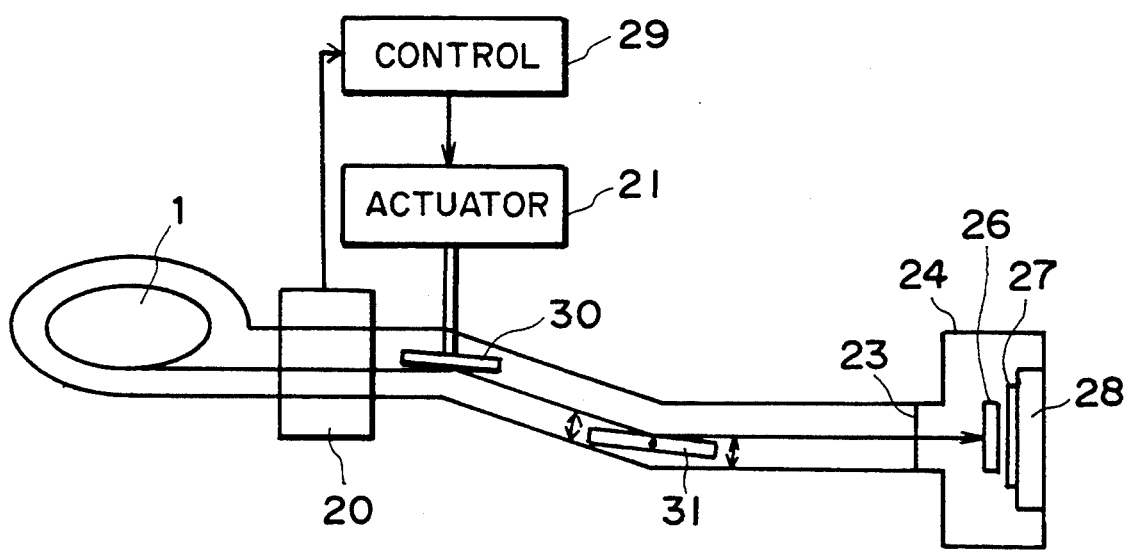
FIG. 4 is a schematic view of an X-ray exposure apparatus according to a fourth embodiment of the present invention.
Figure 5:
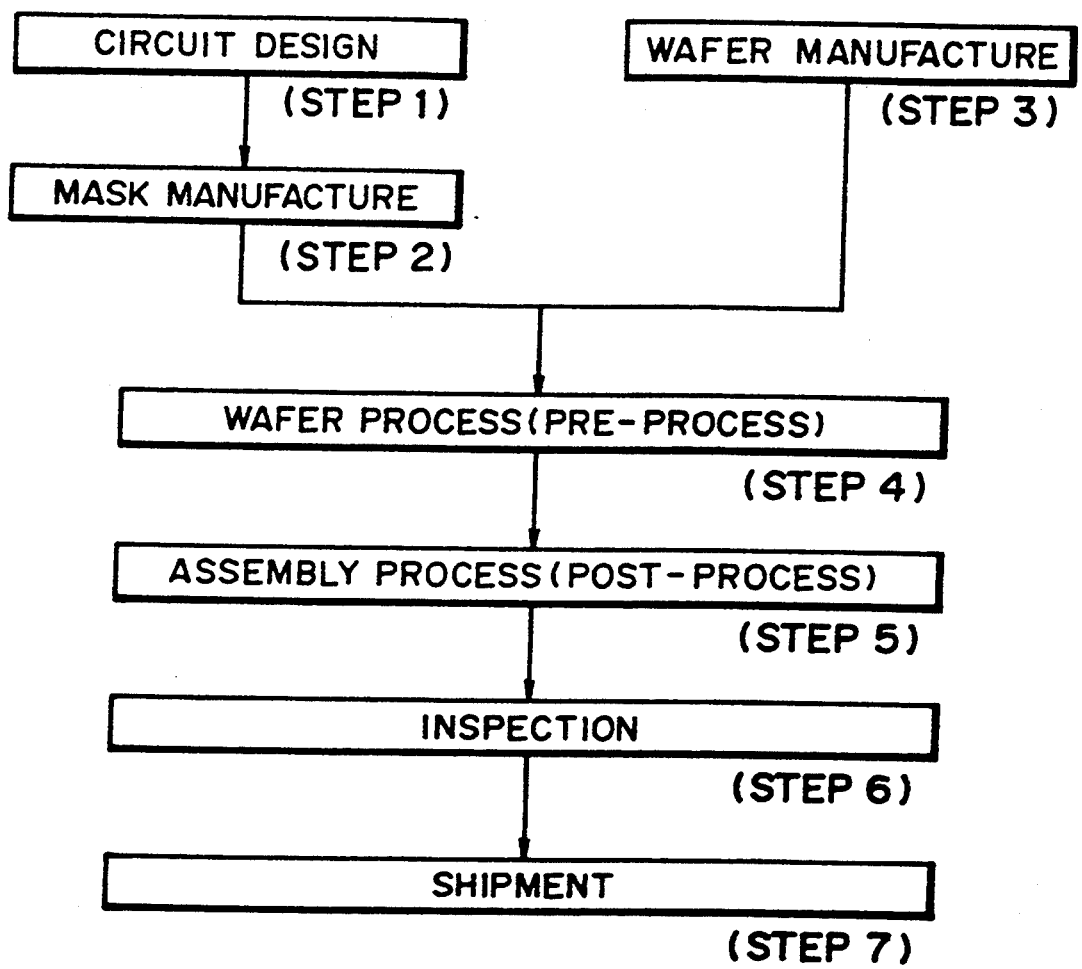
FIG. 5 is a flow chart of microdevice manufacturing processes.
Figure 6:
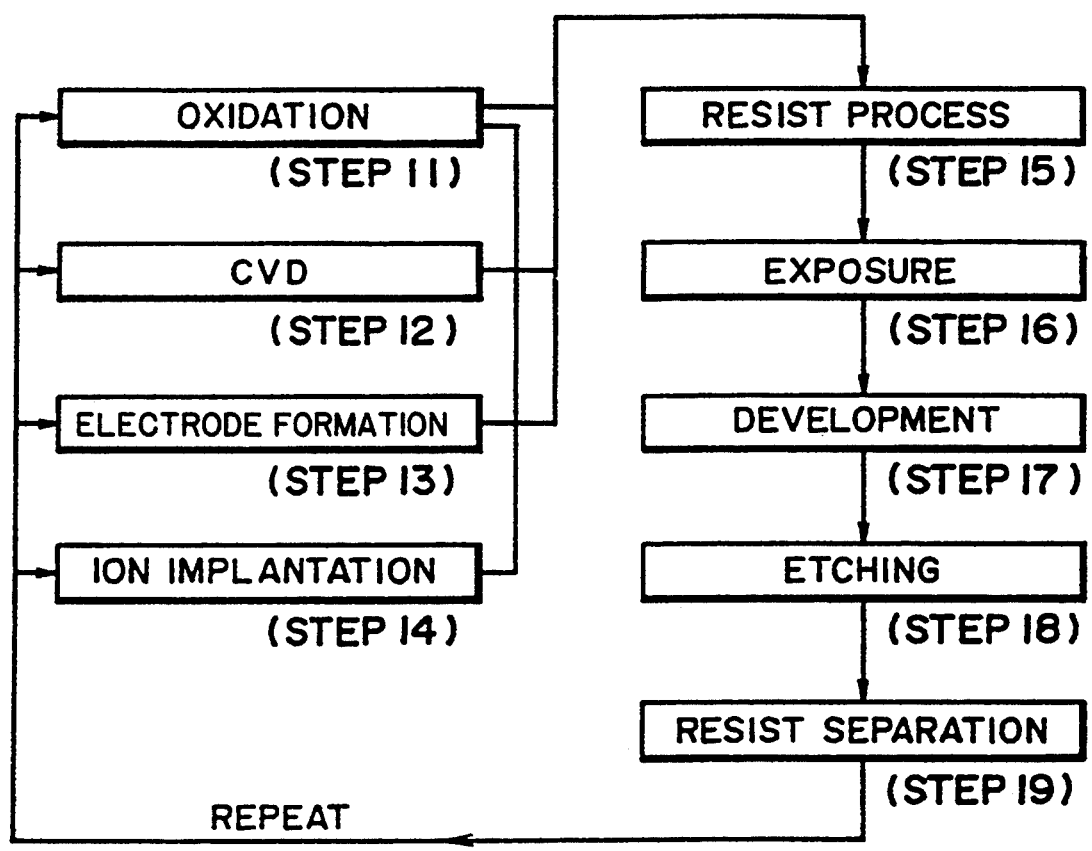
FIG. 6 is a flow chart of a wafer process.
Figure 7:
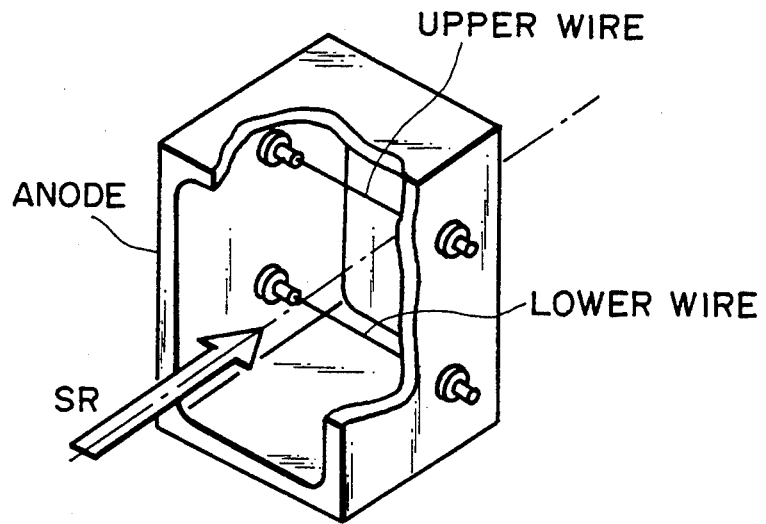
FIG. 7 is a schematic view of a position detecting device of known type.

FIG. 4 shows an exposure apparatus according to a fourth embodiment of the present invention. Like numerals as those of FIG. 3 are assigned to corresponding or similar elements. A radiation X-ray beam emitted from a synchrotron ring 1 is received by a beam position detecting device 20 of the structure as described with reference to any one of the embodiments explained above. The beam is then reflected by a fixed reflection mirror 30, and it is expanded by a swingable mirror 31 and is directed into an exposure apparatus 24.

Controller 29 serves to operate a mirror actuator 21 on the basis of measurement by the beam position detecting device 21, whereby the angular position of the reflection mirror 30 is controlled. This assures uniform exposure of the mask and wafer irrespective of a change in position of a synchrotron radiation beam.

[Embodiment 5]

Figure 8:
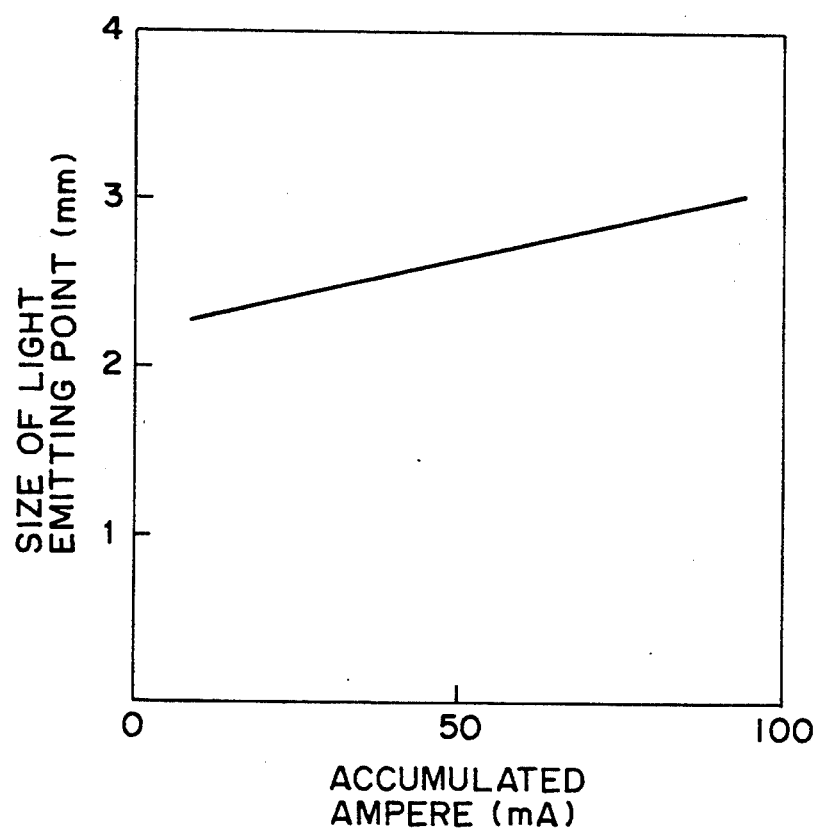
FIG. 8 is a graph for explaining the relationship between an accumulated electric current value and the size of a light emission point of synchrotron.

Now, an embodiment of a microdevice manufacturing method using an exposure apparatus such as described above, will be explained. FIG. 8 is a flow chart of the sequence of manufacturing a semiconductor device such as a semiconductor chip (e.g. IC or LSI), a liquid crystal panel or a CCD, for example. Step 1 is a design process for designing the circuit of a semiconductor device. Step 2 is a process for manufacturing a mask on the basis of the circuit pattern design. Step 3 is a process for manufacturing a wafer by using a material such as silicon.

Step 4 is a wafer process which is called a pre-process wherein, by using the so prepared mask and wafer, circuits are practically formed on the wafer through lithography. Step 5 subsequent to this is an assembling step which is called a post-process wherein the wafer processed by step 4 is formed into semiconductor chips. This step includes assembling (dicing and bonding) and packaging (chip sealing). Step 6 is an inspection step wherein operability check, durability check and so on of the semiconductor devices produced by step 5 are carried out. With these processes, semiconductor devices are finished and they are shipped (step 7).

Figure 9:
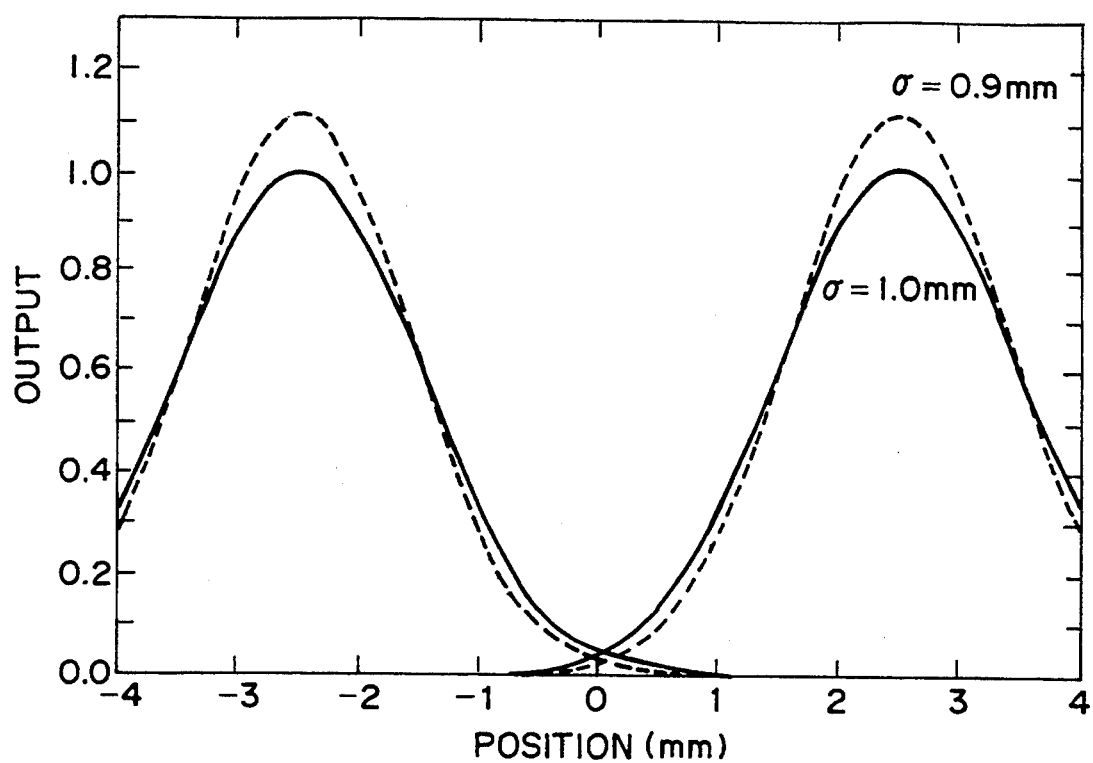
FIG. 9 is a graph for explaining the relationship between the beam position and detected current.
Figure 10:
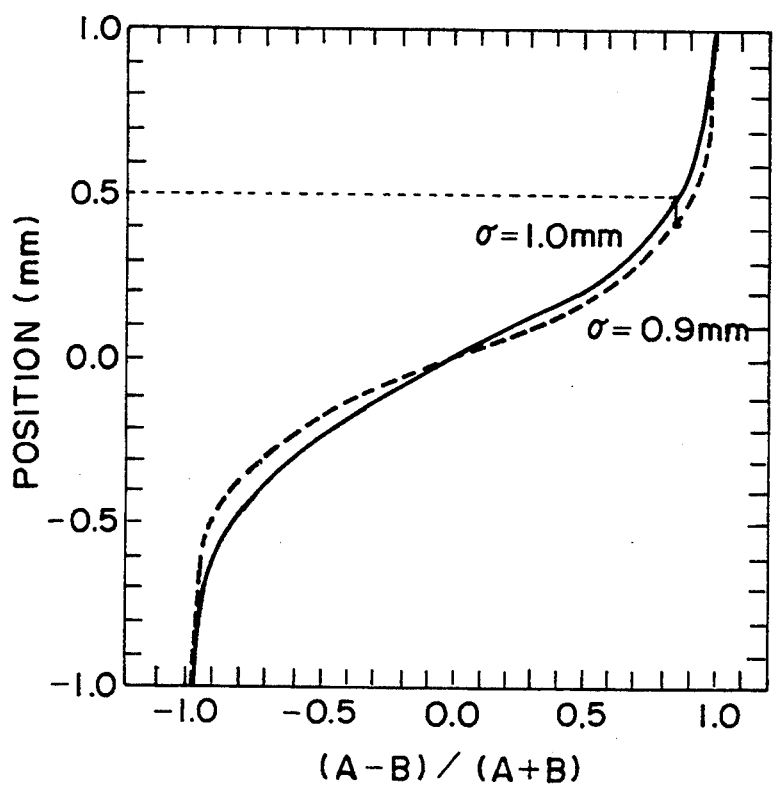
FIG. 10 is a graph for explaining a calibration function.

FIG. 9 is a flow chart showing details of the wafer process. Step 11 is an oxidation process for oxidizing the surface of a wafer. Step 12 is a CVD process for forming an insulating film on the wafer surface. Step 13 is an electrode forming process for forming electrodes on the wafer by vapor deposition. Step 14 is an ion implanting process for implanting ions to the wafer. Step 15 is a resist process for applying a resist (photosensitive material) to the wafer. Step 16 is an exposure process for printing, by exposure, the circuit pattern of the mask on the wafer through the exposure apparatus described above. Step 17 is a developing process for developing the exposed wafer. Step 18 is an etching process for removing portions other than the developed resist image. Step 19 is a resist separation process for separating the resist material remaining on the wafer after being subjected to the etching process. By repeating these processes, circuit patterns are superposedly formed on the wafer.

While the invention has been described with reference to the structures disclosed herein, it is not confined to the details set forth and this application is intended to cover such modifications or changes as may come within the purposes of the improvements or the scope of the following claims.

What is claimed is:

1. A beam position detecting device, comprising:
    detecting means for detecting, at plural sites, the intensity of a radiation beam emitted from a synchrotron ring;
    measuring means for measuring information related to accumulated electric current of the synchrotron ring; and
    determining means for determining the beam position of the radiation beam on the basis of outputs of said detecting means and said measuring means.

2. A device according to claim 1, wherein said measuring means includes a current transformer for directly detecting an accumulated current value.

3. A device according to claim 1, wherein said measuring means includes an intensity detector for detecting the intensity of the radiation beam to indirectly detect an accumulated current value.

4. An irradiation system, comprising:
    an irradiating device for projecting a synchrotron radiation beam to an object to be irradiated; and
    a beam position detecting device for detecting the beam position of the radiation beam, said beam position detecting device including (i) detecting means for detecting, at plural sites, the intensity of a radiation beam emitted from a synchrotron ring, (ii) measuring means for measuring information related to accumulated electric current of the synchrotron ring, and (iii) determining means for determining the beam position of the radiation beam on the basis of outputs of said detecting means and said measuring means.

5. A system according to claim 4, further comprising adjusting means for adjusting the positional relationship between the radiation beam and the object on the basis of an output of said beam position detecting device.

6. A system according to claim 5, wherein said adjusting means includes a reflection mirror.

7. A system according to claim 4, wherein the object to be irradiated comprises one of a mask and a wafer.

8. An exposure method, comprising the steps of:
projecting a radiation beam emitted from a synchrotron ring to an object to be irradiated;

detecting the intensity of the radiation beam, at plural sites:

measuring information related to accumulated electric current of the synchrotron ring;

determining the beam position of the radiation beam on the basis of detecting the intensity of the radiation beam and the measured information related to the accumulated current: and adjusting the positional relationship between the radiation beam and the object on the basis of the determined beam position.

9. A method according to claim 8, wherein the object to be irradiated comprises one of a mask and a wafer.

* * * * *